United States Patent [19]
Ossian et al.

[11] Patent Number: 5,599,475
[45] Date of Patent: Feb. 4, 1997

[54] DE-ICING COMPOSITION AND METHOD FOR MAKING SAME

[75] Inventors: Kenneth C. Ossian, Bettendorf; Norbert J. Steinhauser, Dubuque, both of Iowa

[73] Assignee: Ossian, Inc., Davenport, Iowa

[21] Appl. No.: 529,007

[22] Filed: Sep. 15, 1995

[51] Int. Cl.$^6$ .................................................. C09K 3/18
[52] U.S. Cl. .............................. 252/70; 106/13; 264/117; 23/313 P
[58] Field of Search .............................. 252/70, 71, 73; 106/13, 3

[56] References Cited

U.S. PATENT DOCUMENTS

| | | | |
|---|---|---|---|
| 2,308,289 | 8/1940 | Lawrence | 117/100 |
| 2,716,068 | 8/1955 | Fain et al. | 106/13 |
| 2,988,509 | 6/1961 | Schilberg | 252/70 |
| 5,079,036 | 1/1992 | Roe et al. | 427/212 |
| 5,211,869 | 5/1993 | Steinhauser et al. | 252/70 |

Primary Examiner—Paul Lieberman
Assistant Examiner—Necholus Ogden
Attorney, Agent, or Firm—Zarley, McKee, Thomte, Voorhees, & Sease

[57] ABSTRACT

This composition consists of a coated composition of solid ice melting agents, abrasives and absorbents. The coated composition employs a coating of calcium chloride.

The method of making the composition, also part of the invention, includes placing a solid ice melting agent such as urea, potassium chloride, sodium chloride and abrasives such as sand, gravel, cinders, and absorbents (i.e. calcined diatomaceous earth) into a mechanical stirring device; and spraying a measured amount of adhering solution on to the medium. This adhering solution may be made up, but not limited to, plain water, solutions of organic or inorganic solids with ice melting properties, etc. To this mixture is added a measured amount of powdered non-fully hydrated calcium chloride as a solid coatant. The non-fully hydrated calcium chloride by hydration forms a coating around the ice melt base. The resultant mixture is discharged from the mixer, screened and packaged.

5 Claims, 1 Drawing Sheet

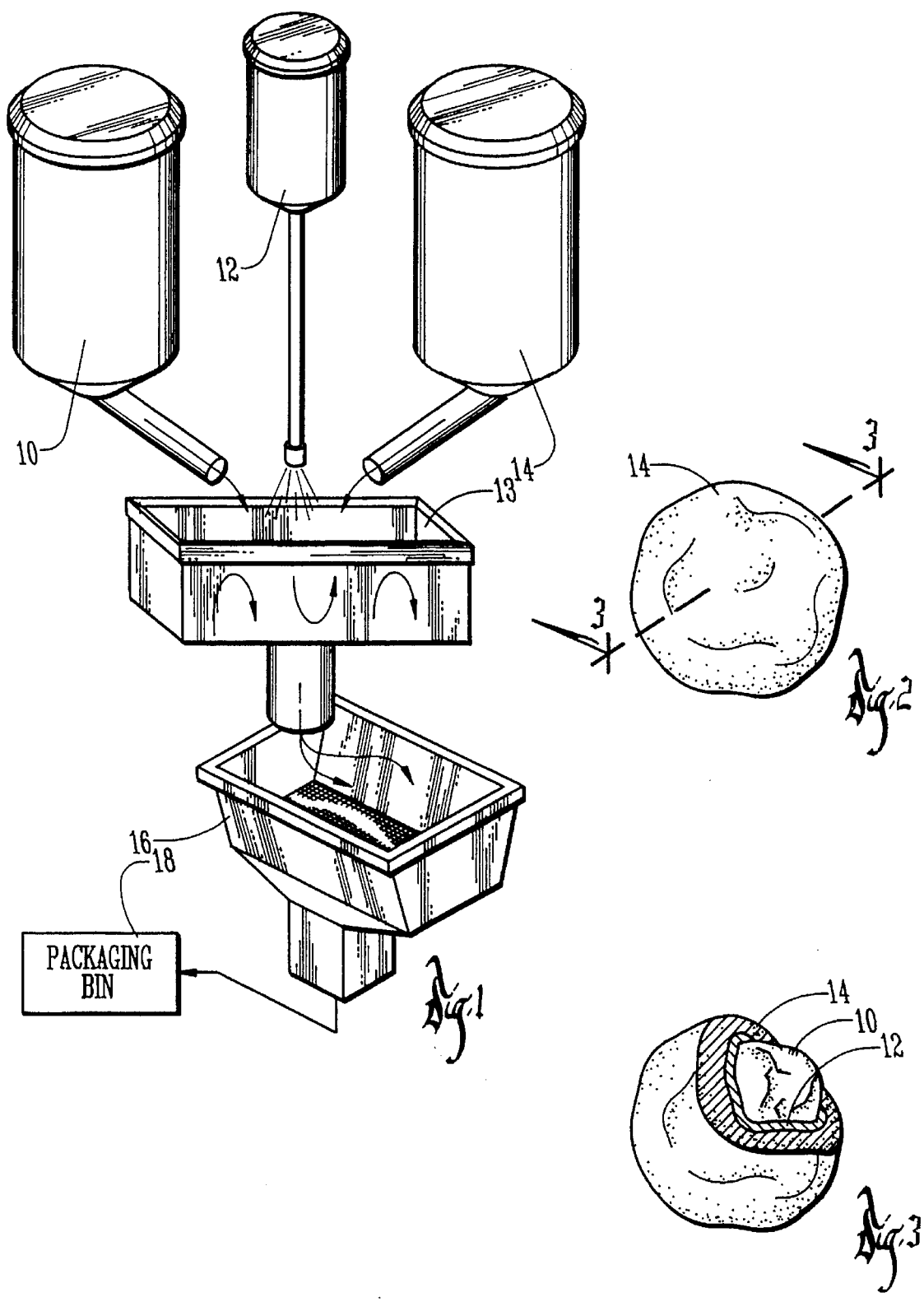

5,599,475

DE-ICING COMPOSITION AND METHOD FOR MAKING SAME

BACKGROUND OF THE INVENTION

The present invention relates to compositions for melting ice on surfaces such as streets, parking lots, sidewalks, etc.

There are many products now used for melting ice and snow. These products can be, but are not limited to, hygroscopic salts such as calcium chloride and magnesium chloride; fertilizers such as potassium chloride and urea; and rock salt and non-slip aggregates like sand, cinders and calcined diatomaceous earth absorbents.

These current commercial products have their advantages and disadvantages. For example, the hygroscopic salts are excellent low-temperature melters, but are expensive and cause slippery conditions when overused. Fertilizers cause minimal problems on runoff as they will aid surrounding vegetation, but as ice melters they have very poor characteristics. Rock salt is inexpensive, will kill vegetation on heavy runoff and has poor ice melting properties. Aggregates, like sand, do not melt or solubilize, and therefore have difficulty embedding into ice to provide a non-slip surface.

To address some of these disadvantages, blends have been employed, but each ingredient acts independently with little to no synergistic effect. Agglomerates such as shown in our previous patent, U.S. 5,211,869 issued May 18, 1993, the disclosure of which is incorporated herein by reference, have been successful, but they are complex in their manufacture and are limited in their ability to synergistically coact with a wide range of base materials.

Accordingly, there is a need for a new ice melting composition, and method for making the same, which allows for a coacting synergistic relationship between the ingredients to provide a commercially acceptable, flowable product at economic prices, and a product that effectively allows good ice melt, favorable abrasion or grip properties, and which avoids undesirable environmental problems caused by runoff, such as vegetation kill. This invention has as its primary objective the fulfillment of this need.

The method and manner of accomplishing this primary objective as well as other objectives will be apparent from the description below.

SUMMARY OF THE INVENTION

This invention relates to an improved de-icing composition and to a method of making that de-icing composition which allows the ingredients of the de-icing composition to synergistically coact so that the final composition, although using individually known ingredients, allows each ingredient to contribute to a desirable overall result. The desirable result is an excellent de-icer with favorable abrasion or gripping properties, and a de-icer which avoids undesirable environmental problems caused by spill, runoff, etc., while at the same time being commercially acceptable in that it has good packaging and free flow properties. The process involves making a solid ice-melting agent which includes conventional ice melters, abrasives and absorbents, mixing this solid ice melting agent with an adhering solution followed by a quick mix with a solid coating effective amount of a non-fully hydrated calcium chloride. As a result, the calcium chloride picks up additional water of hydration, forms a plastic-like mass which coats around the wetted material to provide the final composition which may then be screened and packaged.

BRIEF DESCRIPTION OF THE DRAWINGS

FIG. 1 shows a schematic representation of a typical process for making the product of the present invention.

FIG. 2 shows a typical particle having the solid coatant of the plastic-like mass of non-fully hydrated calcium chloride.

FIG. 3 is a sectional view of the particle of FIG. 2 along line 3—3.

DETAILED DESCRIPTION OF THE INVENTION

An important aspect of the process involves the sequence of operations which includes depositing dry material to be coated into a mechanical stirring device, applying an adhering solution to the dry material to uniformly wet it and, while mixing, adding as a solid coatant material non-fully hydrated calcium chloride, followed by a quick mix for a time sufficient to coat and plasticize and finally discharge to a screening and packing operation.

Key steps and components of the process and composition are:

(1) Dry material to be coated;

(2) An aqueous adhering solution;

(3) The mechanical stirring step; and (4) The solid coatant material which is non-fully hydrated calcium chloride.

Each is discussed in detail below.

(1) Dry Material to be Coated:

This composition component can be divided into three classes of materials, i.e. ice melters, abrasives and absorbents. First are commercially available solid ice melting products such as, but not limited to, urea, potassium chloride, and sodium chloride. The second are dry materials that do not melt, but are used for their abrasive or anti-slip properties such as, but not limited to, sand, cinders and gravel. The third are calcined diatomaceous earth absorbents which also contribute to anti-slip, since they absorb moisture.

In the dry material mix different components may be used, depending on the intended end market. For example, a street or parking lot would utilize sodium chloride coated with calcium chloride for economy. However, if runoff would end up in sensitive vegetation growth, one would want to substitute potassium chloride and/or urea for sodium chloride. On new concrete one would need to control the liquid brine generated in the melting action. The use of abrasives on a steep hill would need assistance in embedding into the ice. The potential for the various dry material mix is unlimited to tailor the product to the specific end use. For present purposes, we have utilized various known products used for de-icing, traction and absorption for winter time needs. It is not our intention to limit the list to the following:

|  | * % by weight range | ideal range |
|---|---|---|
| Ice melters |  |  |
| Sodium Chloride | 60% to 99% | 75% to 95% |
| Potassium Chloride | 60% to 99% | 75% to 95% |
| Urea | 50% to 99% | 60% to 95% |
| Abrasives |  |  |
| Sand | 60% to 99% | 70% to 95% |
| Gravel | 60% to 99% | 70% to 95% |
| Absorbents |  |  |
| Calcined Diatomaceous Earth | 50% to 99% | 60% to 90% |

Next we address the bonding of calcium chloride powder on urea plus heat and use of no aqueous adhering solution.

Bonding of calcium chloride powder on urea can be achieved without an adhering solution because of the low melting point of urea. To begin with, urea is placed in a heated mixer with calcium chloride powder, or the powder can be added later.

The mixer is heated to approximately 180° F. At this stage urea will become sticky and tacky and the calcium chloride easily adheres to the urea base. When all the calcium chloride is bonded, the heat is reduced, the material cooled and packaged. In this process the calcium chloride percentages can vary from 1% to 40%. However, at the higher percentages it may be necessary to increase the heat beyond 180° F. to get total bonding. This process produces a stable product, but is more expensive in energy consumption and more difficult to manufacture. The process of choice to bond calcium chloride powder to urea would be by the use of a coating solution that is covered in detail later.

(2) An Aqueous Adhering Solution

Water by itself is sufficient to function as the adhering solution. However, the addition of various hygroscopic ice melting agents into the aqueous adhering solution is preferred since it enhances the product sheen, promotes long term storage, reduces the amount of water required, strengthens the bonding action, and eliminates much of the fines generated in the mixing process.

These hygroscopic ice melting agents as solutions can be used individually or in combination in an overall aqueous adhering solution. These hygroscopic agents include, but are not limited to, the following: urea, potassium acetate, calcium chloride and magnesium chloride. As a group these hygroscopic agents assist in tying up some of the water when the end product reaches equilibrium, thereby enhancing long-term storage. Also, they add a syrupy, tacky consistency to the adhering solution that reduces the required amount of water to hydrate the calcium chloride. They also strengthen the bonding action, and eliminate the majority of fines in the mixing process.

As mentioned, water by itself is sufficient as the adhering or wetting solution to coat calcium chloride powder around the various dry material mixtures. A weight ratio of one part water by weight to eight parts to fifteen parts of non-fully hydrated calcium chloride will produce the desired bonding action onto the dry materials and is therefore preferred.

The bonding range of the hydrated calcium chloride onto the dry mix solid can range from as low as 1% up to 50%, with the best range between 10% and 40%. In each case the water content for hydration purposes is increased or decreased as the aqueous coating agent, calcium chloride powder, percentages change.

The addition of urea to the aqueous adhering solution can offer many improvements and is therefore preferred. Urea is slightly hygroscopic and deliquescent, and has a low melting point. It is often used by itself as an ice melting agent because of its beneficial effect on vegetation and low corrosion properties.

There are two ways the unique properties of urea contribute to this invention. The first relates to its use as the dry material to be coated, elevating the temperature of that material and adding the solid coatant material which is non-fully hydrated calcium chloride. This process can achieve bonding without an adhering solution and has been explained in the previous section, "Dry material to be coated".

Urea in aqueous solutions exhibits different melting points. When urea is added to water, heated to its solubility point, sprayed on dry ice melt material, and then coated with calcium chloride powder, bonding will occur. Initially, one has the hydration effect of the water from the aqueous adhering solution reacting with calcium chloride powder. This heat of hydration will range from 140°F.–180° F., depending on the calcium chloride percentage. The higher the calcium chloride percentage, the higher the heat generated. The heat generated by the hydration plus the preheating of the aqueous urea solutions keeps the urea portion of the solution from solidifying too quickly. As the solution cools slowly, the urea will solidify, assisting in firming the bonding structure. See Examples #3 and #4 below.

The amount of addition of urea to the coating solution can range from ½ part urea to 3 parts water to 99 parts urea to 1 part water. The best range is 2 parts urea to 3 parts water to 5 parts urea and 1 part water. The addition of the urea to the aqueous coating solution will strengthen the coating bond, reduce the amount of water needed to hydrate the calcium chloride, and reduce fines generated in the mixing process.

The addition of potassium acetate to the adhering solution can improve the bonding process and is also preferred. Potassium acetate is an extremely hygroscopic product and primarily exists in commerce as an approximate 50% solution. This liquid solution of potassium acetate is often used as a liquid de-icer because it is biodegradable, effective to −15° F. in melting ice, and has low corrosion properties. It is well received as a runway de-icer at airports.

A potassium acetate aqueous solution can be used as the coating solution or in combination with urea. The potassium acetate solution has good penetration qualities and produces a sheen in the finished product.

Potassium acetate is most beneficial to the coating solution when it is being applied to ice melt dry mix materials such as sodium and potassium chloride. The ice melt dry mix material cited in previous examples has been urea. Examples 8–13 show addition of potassium acetate. When the surface of the dry mix material to be bonded is harder to penetrate, the addition of potassium acetate to the aqueous adhering solution is of benefit as illustrated in examples 8–13.

In summary, the inclusion of an aqueous solution of potassium acetate by itself or in combination with urea can improve the bonding process, in particular, when the dry ice melt material to be coated has a hard surface structure. For best results, potassium acetate can be used from 1 part potassium acetate to the range of 1 part water to 6 parts water in the aqueous adhering solution.

The addition of calcium and/or magnesium chloride to the adhering solution can also improve the bonding process. Both of these inorganic salts are used extensively as ice melting salts (i.e. in the dry mix materials here described), and also have wide usage as dust control agents in liquid form. These hygroscopic salts aid the adhering solution by keeping some of the water tied up, which helps in storage. Also, solutions of these salts take on a syrupy/tacky consistency which aids in the wetting and bonding of the powder to the dry material being coated. Examples 17 and 18 used added calcium chloride and magnesium chloride solutions.

Commercial solutions of calcium and magnesium chloride are readily available. They are very cost effective to use as an adhering agent to improve bonding and storage capabilities. They may be best utilized in their commercial solution ranges of 25–35% by weight for liquid magnesium chloride and 25–49% for liquid calcium chloride.

To summarize briefly for the aqueous adhering solution, while water is useful, it is most preferred to use some additions to the adhering solution. Hygroscopic solutions of calcium and/or magnesium chloride will require less water in the coating action, aid in storage and add to the ice melting characteristics. The addition of urea to the adhering solution strengthens the bonding action, reduces the fines and reduces the water required for bonding. The addition of potassium acetate to the adhering solution enhances bonding and in particular aids in the penetration of hard surface material such as sodium and potassium chlorides. The aqueous adhering solution may be altered for different ice melt dry mix materials.

(3) Mixing Vessel (The Mechanical Stirring Step)

Because of the hydration process, it is important that the mixing be done quickly. The dry material (10) to be coated is deposited into the mixing vessel (13) (see schematic). The mixing vessel 13 is started and uniformly mixed and the adhering solution (12) is added. It is important that the time period be limited to just enough time to allow a thorough wetting and coating of the particles of dry mix material. If the dry material is not thoroughly wetted and coated, then bonding will not be on all particles. If too much time elapses in mixing, the aqueous adhering solution will soak into the particles, and the urea portion (if present) will start to solidify, and as a result very little calcium chloride will hydrate onto the particles as a plastic-like coating.

A preferred mix time for the adhering solution after its addition is only 6–10 seconds, after which the coating agent calcium chloride powder 14, which is non-fully hydrated, is added. The extent of hydration of the calcium chloride powder will depend on the makeup of the coating solution and the quantity of calcium chloride powder employed. A typical time for partial hydration to dry appearance would range from 15 to 30 seconds. The whole mixing process after the dry material to be coated is deposited would seldom be over one minute and never over five minutes. If the material is mixed for a prolonged time, the material will over hydrate by pulling moisture from the surrounding environment and cause caking in the mixing process. To accomplish this short mix time a fluidized zone twin shafted paddle blender is a preferred mixing vessel. It was used in the examples. After mixing, the material is screened 16 and packaged 18.

(4) The Solid Coatant of Non-Fully Hydrated Calcium Chloride

The key component in the ice melt invention composition is the solid coating agent, i.e. non-fully hydrated calcium chloride. Calcium chloride dry material exists commercially as a monohydrate and dihydrate. When these forms of calcium chloride come into contact with water, they react in an exothermic manner since calcium chloride is a hygroscopic material. This ability of calcium chloride to absorb moisture makes it useful as an ice melter by itself or in combination with other ice melters that exhibit less hygroscopic qualities.

This invention uses the natural characteristics of calcium chloride to attract and hold moisture and generate heat. When this natural hydration process is controlled with a measured amount of moisture, a calcium chloride coating can be applied onto most dry mix solid material of ice melt compositions.

The process consists of the aqueous coating solution being applied to a solid material as earlier described in connection with the mixing vessel. As calcium chloride powder, preferably 80 mesh to 200 mesh, is applied to the mixture, the initial contact with the moisture will convert the calcium chloride to hexahydrate and tetrahydrate with a melting point of 85.8° F. and 113.5° F. respectively. The hydration heat generated will range from 120° F. to 180° F., depending on various calcium chloride ratios. This process allows the formation of a plastic mass that coats the dry mix solids which have previously been wetted with the adherent coating. This excess moisture continues to attract the calcium chloride powder until the free moisture has been totally dried up in the bonding process and the system is allowed to reach equilibrium.

Commercially available calcium chloride monohydrate, 94% or above, is ground to a fine powder, 80 mesh to 200 mesh. This material is very hygroscopic and is easily attracted to water. Various ice melting solids or aggregates can be coated with a measured amount of aqueous coating solution in a mechanical stirring device. The calcium chloride powder hydrates to the moisture on the solids, forming a strong bond. The coated material is discharged from the mixer to a screening operation and packaged.

Commercially available calcium chloride dihydrate, 77%–80% or above, can be used in place of the monohydrate. However, with the extra water content in the dihydrate (20%–33%) combined with the water from the aqueous coating solution, the product may be unstable in long-term storage. This is caused by the increased moisture in the dihydrate. If calcium chloride dihydrate is used, the resulting end product will need additional drying. See Examples #1 and #2 below.

The amount of a coatant of non-fully hydrated calcium chloride used as the solid coatant may vary within the range of from 1% to 50%, and for best results from 10% to 40%.

The following examples are offered to further illustrate, but not limit, both the composition and the process of the present invention.

EXAMPLES 1 & 2

| | #1 | #2 |
|---|---|---|
| Ice melt solid | 100 parts | 100 parts |
| Aqueous adhering solution | | |
| Water content | 3 parts | 3 parts |
| Coating agent | | |
| Calcium chloride monohydrate, 96%, | 30 parts | |
| dihydrate, 77%, | | 30 parts |
| Approximate moisture | 4.2% | 9.9% |

In Example #1 above, the additional water content plus the approximately 4% water in the calcium chloride monohydrate results in a moisture content of 4.2% and effectively changes the calcium chloride from 96% material to 86% when the end product reaches equilibrium. This product is very stable in storage and does not require additional processing, such as drying.

In Example #2 above, the additional water content plus the approximately 23% water in the calcium chloride dihydrate will result in a moisture content of 9.9% and will effectively change the calcium chloride from 77% material to 67% which would approach questionable long-term storage and would advisably require additional drying.

EXAMPLES 3 & 4 DEMONSTRATING USE OF UREA IN THE ADHERING SOLUTION

| | #3 | #4 |
|---|---|---|
| Ice melt solid | 100 parts | 100 parts |
| urea | | |
| Aqueous adhering solution | | |
| water | 3 parts | 3 parts |
| urea | 3 parts | |

-continued

|  | #3 | #4 |
|---|---|---|
| Coating agent | | |
| calcium chloride monohydrate, 96% | 30 parts | 30 parts |

To test the strength of the bond to abrasion, product from #3 and #4 above were screened through a #14 screen. One thousand grams from each sample were placed on a #16 screen and vibrated for 30 minutes on a roto-tap vibrating screen. The results showed #3 (water and urea) produced 1.5% fines and #4 (water alone) produced 2.8% fines. The addition of the urea in the coating solution improved the strength of the bond. Also, the tackiness nature of the solution aided the calcium chloride powder in adhering to the ice melt solid as noticeably less fines were observed in Example #3 as compared to #4.

For storage purposes and to keep the material free flowing, it is highly desirable to use as small an amount of water as possible and still achieve effective bonding. The following Examples 5–7 show that the addition of urea in aqueous solution and heating the solution to its solubility can reduce the amount of water needed to effect the hydration coating with powdered calcium chloride.

EXAMPLES 5–7 ARE UREA EXAMPLES

|  | #5 | #6 | #7 |
|---|---|---|---|
| Ice melt solid | | | |
| urea | 100 parts | 100 parts | 100 parts |
| Aqueous adhering solution | | | |
| water | 2 parts | 2 parts | 1 part |
| urea | 3 parts | 4 parts | 5 parts |
| Coating agent | | | |
| calcium chloride monohydrate, 96% | 30 parts | 30 parts | 30 parts |

Examples #5, #6, #7 were mixed, coated and placed in a lab oven at 120° F. for five days to assimilate storage conditions. At the end of the test period all samples were free flowing. It is possible to use even more concentrated solutions of urea than shown in the above examples.

EXAMPLES 8–13 SHOWING ADHERING SOLUTION ADDITIONS

|  | #8 | #9 | #10 | #11 | #12 | #13 |
|---|---|---|---|---|---|---|
| Ice melt solid | | | | | | |
| potassium chloride | 100 | 100 | 100 | 100 | 100 | 100 |
| Aqueous adhering solution | | | | | | |
| water | 3 | 3 | 4.5 | 6 | 3 | 3 |
| urea | 1 | 2 | 3 | 4 | 2 | |
| potassium acetate | .5 | 1 | 1.5 | 2 | 1 | 3 |
| Solid coating agent | | | | | | |
| calcium chloride monohydrate, 96% | 25 | 25 | 37.5 | 50 | 30 | 30 |

EXAMPLES 14–15 SHOW "SALT" AS THE DRY MIX

|  | #14 | #15 |
|---|---|---|
| Ice melt solid | | |
| sodium chloride | 100 | 100 |
| Aqueous adhering solution | | |
| water | 3 | 3 |
| urea | 2 | 1 |
| potassium acetate | 1 | .5 |
| Solid coating agent | | |
| calcium chloride monohydrate, 96% | 30 | 30 |

Examples #8 through #15 were mixed and placed in a lab oven at 120° F. for five days to assimilate storage conditions. At the end of the test period, all samples were free flowing.

EXAMPLES #17 AND #18 SHOWING CALCIUM CHLORIDE AND MAGNESIUM CHLORIDE SOLUTION AS THE ADHERING AGENT

|  | #17 | #18 |
|---|---|---|
| Ice melt base | | |
| urea | 100 parts | 100 parts |
| Aqueous adhering solution | | |
| water | 3 | 3 |
| calcium chloride | 1.5 | |
| magnesium chloride | | 1.5 |
| Solid coating agent | | |
| calcium chloride monohydrate, 96% | 30 | 30 |

Examples #17 and #18 were mixed, placed in a lab oven at 120° F. for five days to assimilate storage conditions. At the end of the test period, all samples were free flowing.

The present invention very successfully addresses the shortcomings of various aggregates now available as ice melt compositions. By coating the aggregate with calcium chloride, which is non-fully hydrated, it quickly melts and embeds the aggregate into the ice and snow. Should the melted liquid refreeze, the aggregate remains, providing needed traction. Examples 19–22 below show benefits of the overall composition.

EXAMPLE 19–22

|  | #19 | #20 | #21 | #22 |
|---|---|---|---|---|
| Dry material to be coated | | | | |
| sand/gravel mix | 200 parts | 200 parts | | |
| diatomaceous earth absorbents | | | 60 parts | 60 parts |
| Aqueous adhering solution | | | | |
| water | 2 | 4 | 5 | 4 |
| urea | 4 | 8 | 10 | 6 |

-continued

|  | #19 | #20 | #21 | #22 |
|---|---|---|---|---|
| Solid coating agent |  |  |  |  |
| powdered calcium chloride monohydrate, 96% | 30 | 60 | 20 | 20 |

Examples #19 through #22 were mixed, placed in a lab oven at 120° F. for five days to assimilate storage conditions. At the end of the test period all samples were free flowing.

The benefits of coating aggregates such as sand/gravel for quick traction are quite apparent. The coating of diatomaceous earth absorbents accomplishes a dual function. The first, embedding of non-slip absorbents into ice and snow, has already been pointed out. The second benefit of the diatomaceous earth products is their absorbent function. As the calcium chloride coating melts ice, the liquid brine is quickly absorbed into the calcined diatomaceous earth absorbent. This keeps the liquid brine that is generated from the melting action from penetrating into the concrete surface. Spalling of concrete can be accelerated by ice melters because they increase the freeze/thaw cycles. Ice melters generate a liquid brine. This brine solution lowers the freezing point of water and melts ice and snow on contact. The brine continues to melt until it can no longer lower the freeze point of water. Depending on conditions, time, temperature, concentration, etc., the melted solution can and does refreeze. This refreezing can cause concrete damage, especially in new concrete that has not cured yet. The use of a diatomaceous earth absorbent coated with calcium chloride would keep the majority of the brine solution from penetrating into the concrete surface. This would be of benefit, especially on new concrete.

The data below for samples 1–16 test the performance characteristics of the product. To do this, several of the samples were placed in a lab freezer at +15° F. for one hour. The samples consisted of ice that was prefrozen in plastic cylinders. The amount of ice melter placed in each of the cylinders was calculated to simulate actual usage rates.

At the end of one hour the amount of melted material was poured off and measured. The samples were repeated four times, and the average melting ratios were compared. For example, if one gram melted one gram of liquid brine in one hour, the melting ratio would be one.

The average temperature of +15° F. was used, as fertilizers will not melt at this temperature. The results of these comparisons follow:

Table I below shows best results with urea, or urea blended with calcium chloride and urea coated with calcium chloride solid coating agent.

TABLE I

Comparison: Urea. Urea blended with calcium chloride, and urea coated with calcium chloride.
(Sample Numbers 1–7)

| Sample No. | Average Melting Ratio |
|---|---|
| 1 | 0 |
| 2 | 1.1 |
| 3 | 1.3 |
| 4 | 1.3 |
| 5 | 1.6 |
| 6 | 1.7 |
| 7 | 1.9 |

Sample #1—Consisted of urea only and did not register any measurable amount of melted brine.

Sample #2—The equivalence of 25% calcium chloride with no other melting agents present.

Sample #3—A physical blend of 25% calcium chloride and 75% urea.

Sample #4—A 12% coating of calcium chloride onto urea as described in the preceding sections.

Sample #5—A 22% coating of calcium chloride onto urea as described in the preceding sections.

Sample #6—A 25% coating of calcium chloride onto urea as described in the preceding sections.

Sample #7—A 28% coating of calcium chloride onto urea as described in preceding sections.

A review of the results would indicate that as the calcium chloride ratio is increased, the melting ratio is increased.

TABLE II

Comparison: Potassium chloride and potassium chloride coated with calcium chloride
(Sample Numbers 8, 9 and 10)

| Sample No. | Grams Melted Per Unit |
|---|---|
| 8 | 0 |
| 9 | .22 |
| 10 | .84 |

Sample 8—Consisted of potassium chloride only and did not register any measurable amount of melted brine.

Sample 9—A 7.4% coating of calcium chloride onto potassium chloride as described in the preceding sections.

Sample 10—A 15.3% coating of calcium chloride onto potassium chloride as described in the preceding sections.

A review of the results would indicate that as the calcium chloride ratio is increased, the melting ratio is increased.

TABLE 3

Comparison: Sodium chloride and sodium chloride coated with calcium chloride.

| Sample No. | Grams Melted Per Unit |
|---|---|
| 11 | 1.42 |
| 12 | 2.02 |
| 13 | 2.15 |

Sample 11—Consisted of sodium chloride only.

Sample 12—A 7.7% coating of calcium chloride onto sodium chloride as described in the preceding sections.

Sample 13—A 13.7% coating of calcium chloride onto sodium chloride as described in the preceding sections.

A review of the results would indicate that as the calcium chloride ratio is increased, the melting ratio is increased.

In summary, although the various chemical de-icers have significantly different performance levels, they all work in much the same way. None is capable of melting snow and ice in its solid state, but must first come into contact with sufficient moisture to dissolve and form a brine. The brine lowers the freezing point of water and melts ice and snow on contact. The addition of the coating agent calcium chloride to various dry ice melters will allow those melters to form a brine quicker and at lower temperatures than they would without the coating or in a blended formula. Clearly, the addition of a calcium chloride coating onto urea, potassium chloride and sodium chloride enhances their melting performance.

To test the benefits of coating aggregates such as sand, the following comparisons were made. A large block of ice was frozen in a plastic container. Three samples of aggregates were spread on the ice at similar rates. The block of ice was raised at an angle until the aggregate slid to the bottom of the container. All aggregate samples were identical with the exception that samples B and C were coated with 12% and 22% calcium chloride solid coatant respectively.

The steps in the process of the test involved adding the aggregate on the ice pan, raising the pan, and when the aggregate slid to the bottom of the pan, the angle was measured.

Sample 14—Aggregate only, achieved an angle of 45°–50° before sliding to the bottom.

Sample 15—Aggregate coated with 12% calcium chloride achieved an angle of 90° and none of the aggregate slid to the bottom.

Sample 16—Aggregate coated with 22% calcium chloride achieved an angle of 90° and none of the aggregate slid to the bottom.

The results indicate a considerable advantage for aggregates coated with calcium chloride to embed into ice for traction.

To measure the effectives of calcined diatomaceous earth absorbents coated with calcium chloride to effectively melt and reabsorb the melted liquid, the following test was done. Calcined diatomaceous earth absorbent coated with calcium chloride was placed on five samples of frozen ice in plastic cylinders and placed in a lab freezer for one hour at 15° F. After one hour, visual observations indicated no free melted brine in the cylinders. The absorbents appeared to be wet which would indicate all melted material is being picked up and reabsorbed. The absorbents were combined from the test samples, weighed, and placed on a moisture balance scale, moisture removed and reweighed. A review of the test data follows.

| Mixture of Dry Composition | |
|---|---|
| absorbent solid | 60 parts |
| Adhering Solution | |
| water | 5 parts |
| urea | 10 parts |
| Solid Coating Agent of Non-Fully Hydrated Calcium | |
| calcium chloride monohydrate, 96% | 20 parts |

7.16/grams of the above composition were placed on ice for one hour. At the end of one hour the material was reweighed at 12.24/grams. After the removal of all moisture on the sample plus moisture and urea in the coating solution, a net gain of 5.08/grams of water was calculated as being reabsorbed by the absorbent. At 15° F. one part calcium chloride will melt 3 to 3.5 parts ice to water. Based on the moisture pick up in this test, the 1.5/grams of the calcium chloride coated on the absorbent were totally utilized.

In summary, the coating of calcined diatomaceous earth absorbents with calcium chloride is an excellent way of removing melted brine from concrete surfaces and to keep it from entering the concrete surfaces and refreezing.

In total, the coating process outlined is quite versatile and offers improvements in ice melting performance for dry ice melting compounds, aggregates and absorbents and achieves the objectives of the invention as the data demonstrates.

What is claimed is:

1. A process of preparing a uniform free flowing ice melting composition, said process comprising:

admixing a dry materials mix comprising of ice melters, abrasives and absorbents with an aqueous adhering solution of urea, the amount of adhering solution being from one part to eight parts dry material mix to one part to 15 parts urea solution, uniformly mixing for a time sufficient such that the dry mix materials are tacky and wetted but such that the adhering solution does not soak into the dry materials; and thereafter applying 1–50% by weight of a solid coating calcium chloride particles selected from the group consisting of calcium chloride monohydrate, calcium chloride dihydrate and combinations thereof, the size of which are from 80 mesh to 200 mesh, and quick mixing for from one minute to five minutes to provide a plastic-like coating surrounding the added dry materials mix; and thereafter screening and packaging the ice melt composition.

2. The process of claim 1 wherein the adhering solution is selected from the group consisting of water, and water solutions of urea, potassium acetate, calcium chloride and magnesium chloride.

3. The process of claim 1 wherein the solid coating comprises calcium chloride monohydrate.

4. The process of claim 1 wherein the solid coating comprises calcium chloride dihydrate.

5. A process of preparing a uniform free-flowing ice melting composition, said process comprising:

admixing a dry material selected from the group consisting of calcined diatomaceous earth absorbent, sand, gravel, and cinder, with an aqueous adhering solution of urea, the amount of adhering solution being from 1 part to 8 parts dry materials mix to one part to 15 parts urea solution, uniformly mixing until the dry material is tacky and wetted but such that the adhering solution does not soak into the dry materials; and thereafter applying 1–50% by weight of a solid coating particles selected from the group consisting essentially of calcium chloride monohydrate, calcium chloride dihydrate, or combinations thereof, the size of which are from 80 mesh to 200 mesh, and quick mixing for from one minute to five minutes to provide a plastic-like coating surrounding the dry material; and thereafter screening and packaging the ice melt composition.

\* \* \* \* \*